United States Patent Office 3,459,977
Patented Aug. 5, 1969

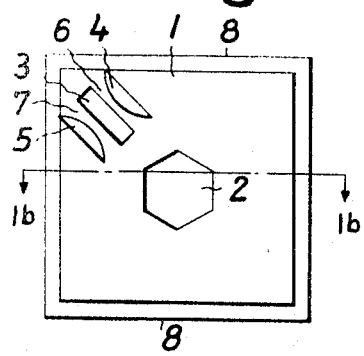
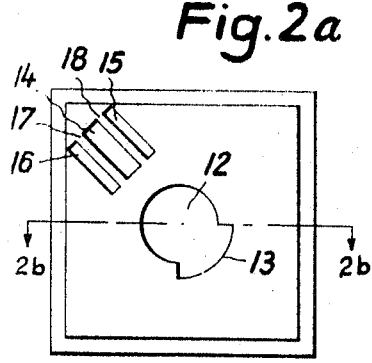
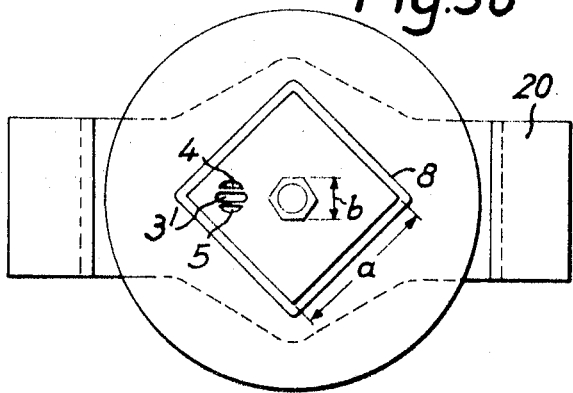

3,459,977
VIBRATION-INSULATING MOUNTING
Hans-Joachim Janssen, Hundsmuhlen uber Oldenburg, Germany, assignor to Licentia Patent-Verwaltungs-G.m.b.H., Frankfurt am Main, Germany
Filed July 26, 1966, Ser. No. 568,007
Claims priority, application Germany, July 26, 1965, L 51,223
Int. Cl. H02k 5/24, 5/00
U.S. Cl. 310—51                5 Claims

ABSTRACT OF THE DISCLOSURE

Vibration-insulating mounting for the center point coupling of a fractional horsepower motor having a hub and a holding pin. The mounting has a flat, elastic, rubber motor support and coupling element with a polygonal outer contour, a non-circular central opening for receiving such hub and an opening spaced radially from such central opening for receiving the holding pin.

---

The present invention relates to a coupling element, and particularly to an element for the center point coupling of a fractional horsepower motor.

In many devices employing small, fractional horsepower motors, it is necessary that as high a vibration insulation as possible be achieved between the motor and the remainder of the device. Such a requirement exists, for example, in sound reproducing apparatus. It has already been suggested to effect such vibration insulation by mounting the motor, with its axis of rotation in a vertical position, according to the center point coupling technique.

One arrangement of this type which has already been suggested employs a motor support and coupling element made of rubber and having a central cut-out for receiving the motor hub. The shape of the cut-out is suitably chosen with respect to that of the motor hub in such a way as to prevent the hub from rotating. In order for such an arrangement to adequately damp rotational vibrations of the order of 120 c.p.s. when supporting an extremely lightweight motor of the type having an output of 1 to 10 watts, it is necessary for the motor support and coupling element to be made of an extremely soft rubber. However, it has been found that when such a motor support and coupling element is made of a rubber which is sufficiently soft to satisfy this requirement, the element is no longer capable of adequately preventing motor rotation and an amount of frictional vibration is created which adversely affects proper vibration insulation.

It is a primary object of the present invention to eliminate these drawbacks.

A more specific object of the present invention is to prevent the occurrence of frictional damping between a motor hub and the motor support and coupling element in which it is mounted.

A further object of the present invention is to provide a motor support and coupling element having a central hub-receiving cut-out which is not required to prevent rotation of its associated motor hub.

These and other objects according to the present invention are achieved by the provision of a novel motor support and coupling element for the center point coupling of a fractional horsepower motor having a hub and at least one holding pin. The novel aspect of the present invention is in providing a flat elastic rubber motor support and coupling element having a polygonal outer contour, a non-circular central opening for receiving the motor hub, and at least one additional opening radially spaced from the central opening for receiving the motor holding pin.

According to one novel feature of the present invention, the rubber disc is additionally provided with web portions adjacent the additional opening for permitting a slight rotary movement of the holding pin about the motor axis of rotation.

Additional objects and advantages of the present invention will become apparent upon consideration of the following description when taken in conjunction with the accompanying drawings in which:

FIGURE 1a is a plan view of a first embodiment of the present invention.

FIGURE 1b is an elevational, cross-sectional view taken along the line 1b—1b of the element of FIGURE 1a.

FIGURE 2a is a plan view of another embodiment of the present invention.

FIGURE 2b is an elevational, cross-sectional view taken along the line 2b—2b of the embodiment of FIGURE 2a.

FIGURE 3a is a longitudinal, cross-sectional view of an assembly employing one embodiment of the present invention.

FIGURE 3b is a plan view taken along the plane defined by the lines 3b—3b of FIGURE 3a.

The embodiment shown in FIGURES 1a and 1b is a flat elastic rubber motor support and coupling element 1 having a square outer contour defined by edges 8 and a hexagonal central opening 2 for receiving the hub of the motor which it is to support. Motor support and coupling element 1 is also provided with an elongated, radially extending rectangular opening 3 which is radially spaced from the central opening 2, and with two further openings 4 and 5 disposed on opposite sides of opening 3 and spaced therefrom to form webs 6 and 7 which extend substantially parallel to the longitudinal dimension of opening 3.

In order to assemble a unit incorporating motor support and coupling element 1, a fractional horsepower motor is mounted thereon by slipping its hub through the opening 2 and by inserting a radially spaced, axially projecting holding pin forming a part of the motor housing into the additional opening 3. The motor-coupling element assembly is then mounted by inserting the motor support and coupling element 1 into a suitable holding yoke or frame of the apparatus with which the motor is to be used. The holding yoke or frame is suitably shaped for receiving the edges 8 of the motor support and coupling element 1. This frame is preferably so dimensioned that the motor support and coupling element is loosely held therein, i.e. so that no radial compression is applied to the motor support and coupling element.

One such arrangement is shown in FIGURES 3a and 3b wherein there is provided a support structure including a yoke 20 and a cover plate 21 rigidly connected to the yoke. Cover plate 21 and the bottom of yoke 20 are each provided with a suitably shaped opening or frame, for receiving a respective motor support and coupling element. Each motor support and coupling element is provided with a hub-receiving opening for receiving a respective one of the hubs 2′ and 2″ of a fractional horsepower motor 19 to be mounted. Each end of the motor is further provided with a holding pin 3′ or 3″, respectively, for insertion into the additional opening 3 of its associated coupling element. As is indicated on the drawing, each motor support and coupling element may be given a square outer contour each side of which has a length $a$ of the order of 28 mm. and a hexagonal central opening having a maximum diameter of 9 mm. and a distance $b$ between opposite sides of the order of 8 mm., the hubs 2′ and 2″ being suitably dimensioned to fit in their respective central openings.

In order to assemble the device shown in FIGURES 3a and 3b, the lower motor support and coupling element is first inserted in a frame defined by the bottom of yoke 20 and the motor is mounted on this coupling element with its hub 2" in the central opening thereof and its holding pin 3" in the additional opening formed in the coupling element. The upper motor support and coupling element is then fitted around the upper hub 2' of the motor, with the holding pin 3' fitting through the additional opening formed in the upper motor support and coupling element, and the cover plate 21 is positioned so that it fits around the upper motor support and coupling element and is then rigidly connected to yoke 20.

The arrangement according to the present invention has the advantage that motor rotation is prevented by the holding pin inserted in opening 3, rather than by any frictional forces produced between the motor hub and opening 2. Therefore, the central opening 2 is not relied upon for preventing motor rotation. As a result, the motor hub, and hence the opening 2, can be given an extremely small diameter so that the motor support is disposed very close to its center point, thereby producing a coupling having a high spring constant transformation value.

Since the webs 6 and 7 associated with opening 3 are made of the same soft rubber as the remainder of motor support and coupling element 1, they function as soft springs which do not offer any stiff resistance to lateral movements of the holding pin until one web or the other has been laterally deflected by a sufficient amount to come into contact with the opposite wall of its associated further opening 4 or 5.

The embodiment of FIGURES 2a and 2b is a similar flat elastic rubber motor support and coupling element having a central opening defined by a first circular arcuate portion 12 and a second arcuate portion 13 having a larger radius than the portion 12. This central opening thus has the general form of a key and is intended to receive the motor hub having a similar configuration.

The embodiment of FIGURES 2a and 2b is also provided with an additional opening 14 radially spaced from the central opening and with further openings 15 and 16 disposed on opposite sides of opening 14 and defining webs 17 and 18 whose function is the same as that of webs 6 and 7 of FIGURES 1a and 1b.

This motor support and coupling element is assembled in the same manner as that described above in connection with FIGURES 1a and 1b. It should be noted that the embodiment of FIGURES 2a and 2b also differs from that of FIGURES 1a and 1b in that the further openings 15 and 16 are rectangular, whereas the comparable openings 4 and 5 of FIGURES 1a and 1b have the form of circular segments.

It will be understood that the above description of the present invention is susceptible to various modifications, changes, and adaptations, and the same are intended to be comprehended within the meaning and range of equivalents of the appended claims.

What is claimed is:

1. A vibration-insulating mounting for the center point coupling of fractional horsepower motor having a hub and at least one holding pin, comprising a flat elastic rubber motor support and coupling element having a polygonal outer contour, a non-circular central opening for receiving such hub, and at least one additional opening radially spaced from said central opening for receiving such holding pin.

2. An arrangement as defined in claim 1 wherein said motor support and coupling element is provided with two supplemental openings associated with each said additional opening, said supplemental openings being spaced laterally from said associated additional opening and disposed on opposite sides thereof, said two supplemental openings and associated additional opening together defining two webs.

3. An arrangement as defined in claim 1 wherein said motor support and coupling element has a square outer contour.

4. An arrangement as defined in claim 1 wherein said motor support and coupling element has a central opening constituted by a first circular arcuate portion and a second circular arcuate portion having a larger radius than said first portion.

5. In combination with the arrangement defined in claim 1, a fractional horsepower motor having a hub disposed in said central opening and an axially projecting holding pin disposed in said additional opening.

References Cited

UNITED STATES PATENTS

| 2,074,136 | 3/1937 | Welch | 310—51 |
| 2,127,979 | 8/1938 | Loftis | 310—51 |
| 2,607,819 | 8/1952 | Sutton | 310—91 |
| 3,114,060 | 12/1963 | Goettl | 310—91 XR |
| 3,270,222 | 8/1966 | Shaffer | 310—51 |

FOREIGN PATENTS

| 213,051 | 12/1955 | Australia. |
| 444,799 | 3/1936 | Great Britain. |

MILTON O. HIRSHFIELD, Primary Examiner

ALFRED G. COLLINS, Assistant Examiner

U.S. Cl. X.R.

310—91